US012800501B2

(12) United States Patent
He et al.

(10) Patent No.: US 12,800,501 B2
(45) Date of Patent: Nov. 17, 2026

(54) INSPECTION DEVICE

(71) Applicant: RAYLEIGH VISION INTELLIGENCE CO. LTD., Hsinchu City (TW)

(72) Inventors: Jr-Hau He, Hsinchu City (TW); Der-Hsien Lien, Taipei (TW); Zhi-Ting Ye, Miaoli County (TW)

(73) Assignee: RAYLEIGH VISION INTELLIGENCE CO. LTD., Hsinchu City (TW)

( * ) Notice: Subject to any disclaimer, the term of this patent is extended or adjusted under 35 U.S.C. 154(b) by 69 days.

(21) Appl. No.: 18/636,311

(22) Filed: Apr. 16, 2024

(65) Prior Publication Data

US 2025/0321190 A1 Oct. 16, 2025

(51) Int. Cl.
*G01N 21/64* (2006.01)
*G01N 21/88* (2006.01)
*G01N 21/95* (2006.01)

(52) U.S. Cl.
CPC ..... *G01N 21/6489* (2013.01); *G01N 21/8806* (2013.01); *G01N 21/9501* (2013.01); *G01N 2021/8835* (2013.01); *G01N 2021/8845* (2013.01)

(58) Field of Classification Search
CPC ........... G01N 21/6489; G01N 21/8806; G01N 21/9501; G01N 2021/8835; G01N 2021/8845
USPC ...................... 356/237.1–237.6, 239.1–239.8
See application file for complete search history.

(56) References Cited

U.S. PATENT DOCUMENTS 6,469,311 B1 * 10/2002 Modlin .............. G01N 21/6408 250/576
2024/0280490 A1 * 8/2024 Perry ................ G02B 21/0032
2024/0377338 A1 * 11/2024 Fan ...................... G01N 21/956
2025/0052608 A1 * 2/2025 Xu ...................... G01R 31/2635

FOREIGN PATENT DOCUMENTS

TW 201331568 A 8/2013

OTHER PUBLICATIONS

TIPO, "The First Office Action for TW Application No. 113128613 was issued by TIPO on Jan. 14, 2025", TIPO.

* cited by examiner

*Primary Examiner* — Tri T Ton
(74) *Attorney, Agent, or Firm* — WPAT, PC

(57) ABSTRACT

The present invention provides an inspection device. A light source emits a mixed light beam to an object to enable photoluminescence of the object and generating an inspection light beam. After the inspection light beam passes through one of a plurality of filters, it is emitted to a beam splitter. A part of the inspection light beam is emitted to a shortwave filter while the other part is emitted to a longwave filter. The shortwave filter filters out the shortwaves of the first split light beam and the filtered first split light beam is emitted to a first sensing element. The longwave filter filters out the longwaves of the second split light beam and the filtered second split light beam is emitted to a second sensing element. The filter conversion module uses a conversion structure to alter the plurality of filters.

7 Claims, 6 Drawing Sheets

INSPECTION DEVICE

FIELD OF THE INVENTION

The present invention is to provide an inspection device, in particular to a device that uses photoluminescence to inspect micro LED panels.

BACKGROUND OF THE INVENTION

With the active development of light-emitting diode (LED) display technology, the size of LED die continues to shrink, and has entered the range of several microns. Among them, micro light-emitting diodes (micro LED) are the main focus of technology development. The industry is trying to package LEDs into tiny sizes to achieve higher pixel density and display quality, and is gradually introducing quantum-dot technology to improve luminous efficiency and color performance.

The high brightness and contrast of micro LEDs make them ideal for large displays while also providing better energy efficiency. The innovation in the micro LED technology continues to address different application needs, and to improve display quality and performance.

The development of micro LEDs represents an important trend in display technology, and its advantages include high brightness, high contrast, fast response time, and low power consumption. This technology is expected to become a mainstream display solution for various electronic devices in the future.

While transferring micro LEDs in large quantities, high yields must be ensured to avoid the need for product repairs. Especially when the die size of LEDs is extremely small, repair becomes almost impossible, which may lead to defects in the display, thereby affecting the overall process yield and thus adversely affecting the cost. Therefore, how to effectively screen for normal operation, and even further screen for uniform quality LED dies, has become a crucial inspection technology.

According to the prior art, the electroluminescence (EL) measurement methods are widely used to inspect micro LED panels. These EL measurement methods first use a probe card to provide electrical signals to LEDs to stimulate light emission. The optical properties are then evaluated by measuring the light signals generated by the LEDs.

However, with the continuous advancement of manufacturing processes, when the size of LEDs is further miniaturized, such as the above-mentioned micro LEDs, the spacing between adjacent pads will shrink, which makes it more difficult to use probe cards to perform EL measurements on micro LEDs. In addition, when the distance between two adjacent micro LEDs is shortened, the probe spacing of the probe card is difficult to reduce due to structural limitations, which results in the probe card being unable to detect more than two micro LEDs at the same time. Consequently, the detection efficiency will be reduced and the inspection time and cost will be increased. Accordingly, the industry needs an inspection technology that is non-contact and can inspect a large number of LEDs at one time.

In view of the above-mentioned problems according to the prior art, the present invention provides an inspection device that uses photoluminescence (PL) for inspection and a conversion device with filters. Then, use a secondary filter to correspondingly remove short- and long-wavelength ranges to obtain photoluminescence images. Accordingly, the characteristics of micro LED panels can be evaluated completely.

SUMMARY OF THE INVENTION

An objective of the present invention is to provide an inspection device, which uses photoluminescence to inspect micro LED panels. It comprise a conversion device of filters for acquiring images of multiple wavelengths of light. Then a secondary filter is used to remove short- and long-wavelength ranges to obtain a plurality of photoluminescence images. Furthermore, a processing module is adopted to assess defects or damages in micro LEDs.

To achieve the above objective and efficacy, the present invention provides an inspection device, using to inspect an object. The inspection device comprises a light source, a processing module, an inspection module, and a filter conversion module. The light source emits a plurality of light beams to form a mixed light beam. The processing module is connected electrically to the light source. The inspection module includes a first sensing element, a shortwave filter, a beam splitter, a longwave filter, and a second sensing element. The first sensing element is connected electrically to the processing module. A side of the shortwave filter is disposed on a side of the first sensing element correspondingly. A side of the beam splitter is disposed on the other side of the shortwave filter correspondingly. A side of the longwave filter is disposed on the other side of the beam splitter correspondingly. A side of the second sensing element is disposed on the other side of the longwave filter correspondingly. The second sensing element is connected electrically to the processing module. The filter conversion module includes a conversion structure and a plurality of filters. The plurality of filters are embedded annularly around the conversion structure. One of the plurality of filters is disposed corresponding to the beam splitter. The mixed light beam is emitted to the object to enable photoluminescence of the object and generating an inspection light beam. After the inspection light beam passes through one of the plurality of filters, it is emitted to the beam splitter. The beam splitter splits the inspection light beam to a first split light beam and a second split light beam. The first split light beam is emitted to the shortwave filter while the second split light beam is emitted to the longwave filter. The shortwave filter filters out the shortwaves of the first split light beam and the filtered first split light beam is emitted to the first sensing element. The longwave filter filters out the longwaves of the second split light beam and the filtered second split light beam is emitted to the second sensing element. The first sensing element generates a first image signal according to the intensity of the first split light beam. The second sensing element generates a second image signal according to the intensity of the second split light beam. Then the inspection device can be used to assess defects or damages in micro LED panels.

According to an embodiment of the present invention, the object includes a substrate and a plurality of LEDs. The plurality of LEDs are disposed on the substrate.

According to an embodiment of the present invention, the light source emits the mixed light beam above the substrate.

According to an embodiment of the present invention, the light source emits the mixed light beam under the substrate.

According to an embodiment of the present invention, the light beam emitted from the light source includes red, green, and blue light with different wavelengths.

According to an embodiment of the present invention, the conversion structure rotates to move one of the plurality of filters corresponding to the beam splitter.

According to an embodiment of the present invention, the conversion structure is rotated by a motor to move one of the plurality of filters corresponding to the beam splitter.

According to an embodiment of the present invention, the individual filtering wavelengths of the plurality of filters are different.

According to an embodiment of the present invention, the plurality of filters are formed by a plurality of multi-broadband filters for wavelengths 600 nm~660 nm, 500 nm~550 nm, and 440 nm~470 nm. The individual filtering wavelengths of the plurality of multi-broadband filters are different in the range.

According to an embodiment of the present invention, the first sensing element transmits the first image signal to a processing module. The second sensing element transmits the second image signal to the processing module. The processing module overlaps and strengthens the first image signal and the second image signal for generating an inspection result.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

To solve the problem according to the prior art, the present invention provides an inspection device, which uses photoluminescence to inspect micro LED panels. It comprise a conversion device of filters for acquiring images of multiple wavelengths of light. Then a secondary filter is used to remove short- and long-wavelength ranges to obtain a plurality of photoluminescence images. Furthermore, a processing module is adopted to assess defects or damages in micro LEDs according to the plurality of images. Thereby, the problems of low inspection efficiency and increased inspection time and costs according to the prior art can be solved.

Figure 1:
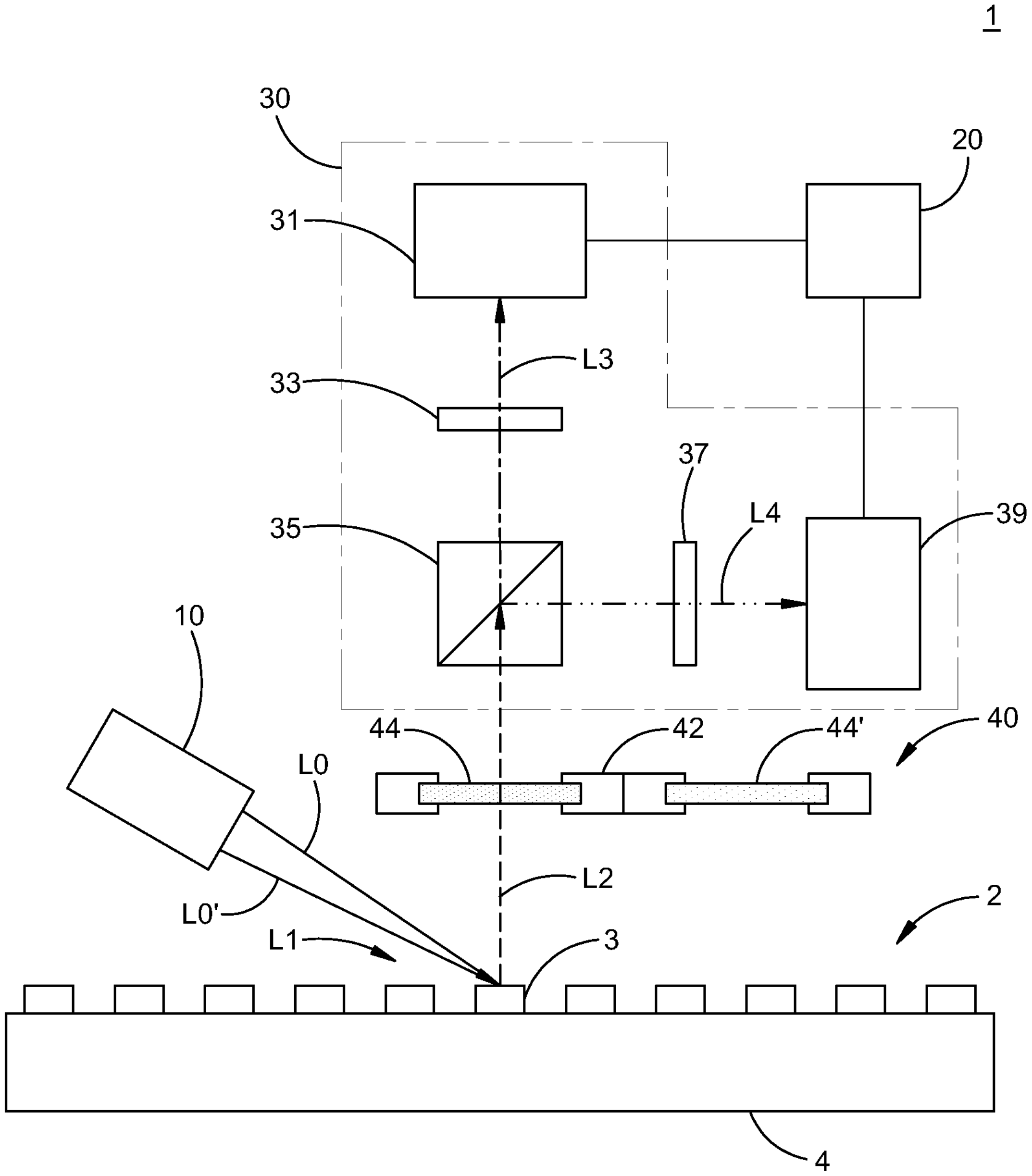
FIG. 1 shows a schematic diagram of the structure according to an embodiment of the present invention.

Please refer to FIG. 1, which shows a schematic diagram of the structure according to an embodiment of the present invention. As shown in the figure, the present embodiment is the first embodiment, which provides an inspection device 1 for inspecting an object. The inspection device 1 comprises a light source 10, an inspection module 30, and a filter conversion module 40. According to the present embodiment, the object 2 receives a mixed light beam L1 of the light source 10 for enabling photoluminescence and generating an inspection light beam L2.

Figure 2:
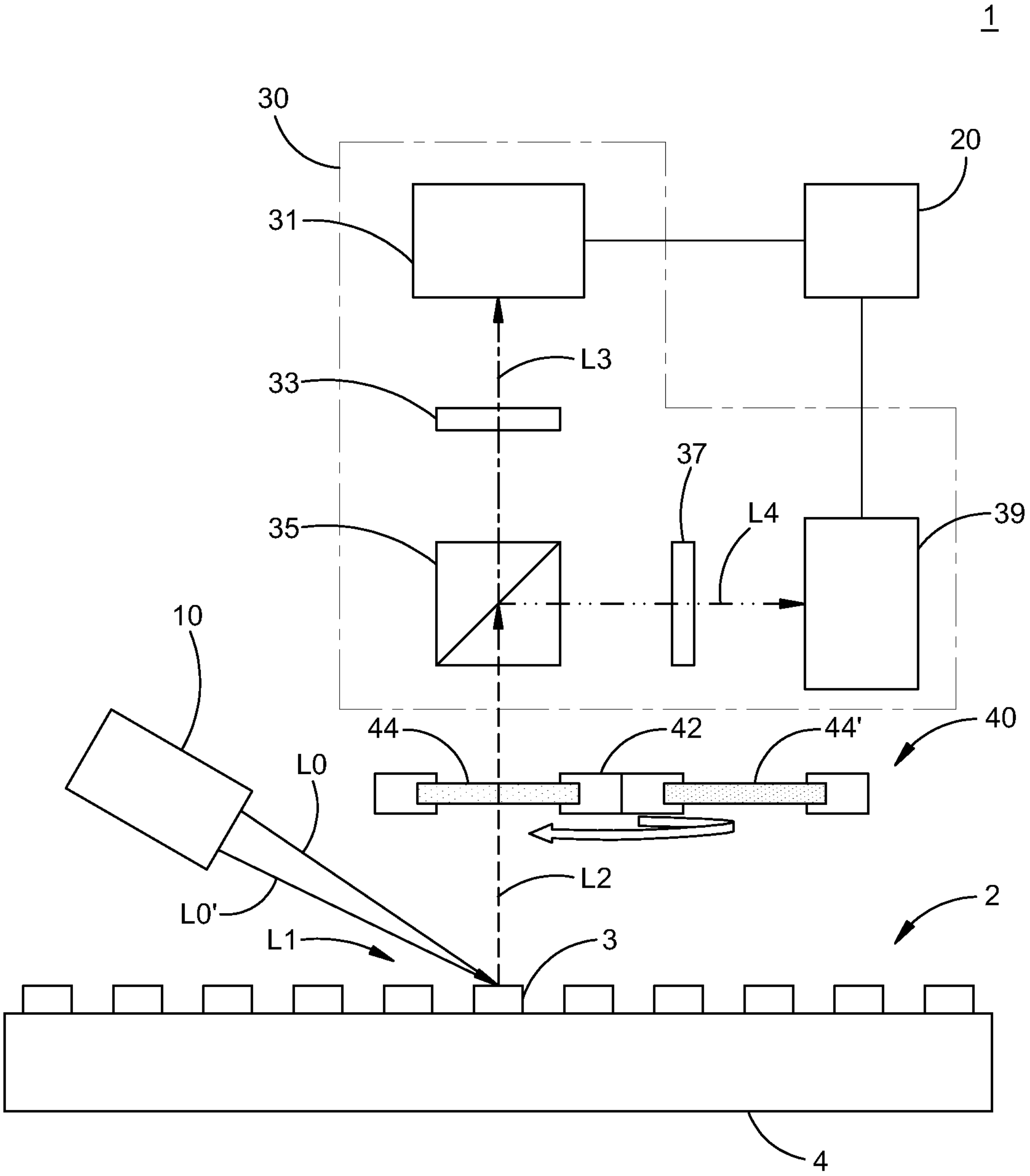
FIG. 2 shows a schematic diagram of converting the filter according to an embodiment of the present invention.

Please refer to FIG. 1 again and to FIG. 2, which shows a schematic diagram of converting the filter according to an embodiment of the present invention. As shown in the figures, according to the present embodiment, the light source 10 emits a plurality of light beams L0, L0', which form the mixed light beam L1. The inspection module 30 includes a first sensing element 31, a shortwave filter 33, a beam splitter 35, a longwave filter 37, and a second sensing element 39. A side of the shortwave filter 33 is disposed on a side of the first sensing element 31 correspondingly. A side of the beam splitter 35 is disposed on the other side of the shortwave filter 33 correspondingly. A side of the longwave filter 37 is disposed on the other side of the beam splitter 35 correspondingly. A side of the second sensing element 39 is disposed on the other side of the longwave filter 37 correspondingly. The filter conversion module 40 includes a conversion structure 42 and a plurality of filters 44. The plurality of filters 44 are embedded annularly around the conversion structure 42. One of the plurality of filters 44 is disposed corresponding to the beam splitter 35. The light beam passes through one of the plurality of filters 44 before emitting to the beam splitter 35.

The mixed light beam L1 is emitted to the object 2 to enable photoluminescence of the object 2 and generating an inspection light beam L2. The inspection light beam L2 is emitted to and passes through one of the plurality of filters 44. After the inspection light beam L2 passes through one of the plurality of filters 44, it is emitted to the beam splitter 35. The beam splitter 35 splits the inspection light beam L2 to a first split light beam L3 and a second split light beam L4. The first split light beam L3 is emitted to the shortwave filter 33 while the second split light beam L4 is emitted to the longwave filter 37. The shortwave filter 33 filters out the shortwaves of the first split light beam L3 and the filtered first split light beam L3 is emitted to the first sensing element 31. The longwave filter 37 filters out the longwaves of the second split light beam L4 and the filtered second split light beam L4 is emitted to the second sensing element 39. The first sensing element 31 generates a first image signal according to the intensity of the first split light beam L3. The second sensing element 39 generates a second image signal according to the intensity of the second split light beam L4.

According to the present embodiment, the inspection device 1 further comprises a processing module 20, which is connected electrically to the light source 10 for controlling the light source 10. The processing module 20 is connected electrically to the first sensing element 31 and the second sensing element 39 for receiving the first image signal and the second image signal.

According to the present embodiment, the object 2 includes a substrate 4 and a plurality of LEDs 3. The plurality of LEDs 3 are disposed on the substrate 4. They are illuminated by the mixed light beam L1 of the light source 10 to emit light by photoluminescence and generating the inspection light beam L2.

According to the present embodiment, the plurality of LEDs 3 are, but not limited to, micro LEDs.

According to the present embodiment, the processing module 20 is connected electrically to the first sensing element 31 and the second sensing element 39 for receiving the image signals transmitted from the first sensing element 31 and the second sensing element 39. Furthermore, the processing module 20 is connected electrically to the filter conversion module 40 for controlling the rotation of the conversion structure 42.

According to the present embodiment, the individual filtering wavelengths of the plurality of filters 44 are different for achieving the efficacy of multi-band inspection.

According to an embodiment of the present invention, the plurality of filters 44 are formed by a plurality of multi-broadband filters. For example, two multi-broadband filter are stacked to form one of the plurality of filters 44. Multi-broadband filters allow passage of multiple wavelength ranges, preferably of wavelengths 600 nm~660 nm, 500 nm~550 nm, and 440 nm~470 nm. In addition, the individual filtering wavelengths of the plurality of multi-broadband filters are different in the range. Thereby, the number of filters for inspection can be further reduced.

According to the present embodiment, the conversion structure 42 of the filter conversion module 40 rotates to move one of the plurality of filters 44 corresponding to the beam splitter 35. The conversion structure 42 is used to alter different filters 44.

According to the present embodiment, the shortwave filter 33 is a longpass filter that allows passage the light with wavelength greater than a set wavelength and blocks the light with wavelength smaller than the set wavelength (for example, blocking wavelengths below 400 nm). It can remove the interference light outside the desired band, and thus enhancing imaging clarity and the sensitivity of sensor.

According to the present embodiment, the longwave filter 37 is a shortpass filter that allows passage the light with wavelength smaller than a set wavelength and blocks the light with wavelength greater than the set wavelength (for example, blocking wavelengths above 600 nm). It can remove the interference light outside the desired band, and thus enhancing imaging clarity and the sensitivity of sensor.

According to the present embodiment, the mixed light beam L1 emitted from the light source 10 includes, but not limited to, red, green, and blue light.

According to the present embodiment, the light source 10 emits the mixed light beam L1 above the substrate 4 to the plurality of LEDs 3.

According to the present embodiment, the first sensing element 31 and the second sensing element 39 can be an image sensor such as a CCD or a CMOS sensor.

According to the present embodiment, while inspecting, the light source 10 can first generate multiple light beams. The multiple light beams are then mixed to give the mixed light beam L1 and corresponding to the devices (for example, the above LEDs 3) of the object 2, respectively, for stimulating the object 2 and generating the inspection light beam L2. Next, the conversion structure 42 of the filter conversion module 40 and the plurality of filters 44 are used to filter out light beams with different wavelengths by altering the filters by rotation. The inspection module 30 measures the inspection light beam L2 with different wavelengths to give a plurality of images (for example, the spectrum information, or the light intensity information) of the object 2. Afterwards, the processing module 20 overlaps the plurality of images. By using the photoluminescence measurement method, the processing module 20 can further judge the light generated by the object by illuminating with different wavelengths. Thereby, the accuracy of judging defects in the object 2 can be improved.

According to the present embodiment, the beam splitter 35 splits the inspection light beam L2 into the first split light beam L3 and the second split light beam L4, which are further emitted to the shortwave filter 33 and the longwave filter 37, respectively. Then the image overlapping method is used to avoid intensity loss of the inspection light beam L2 due to multiple filters. The loss will lead to blurred images and make inspection difficult.

Figure 3:
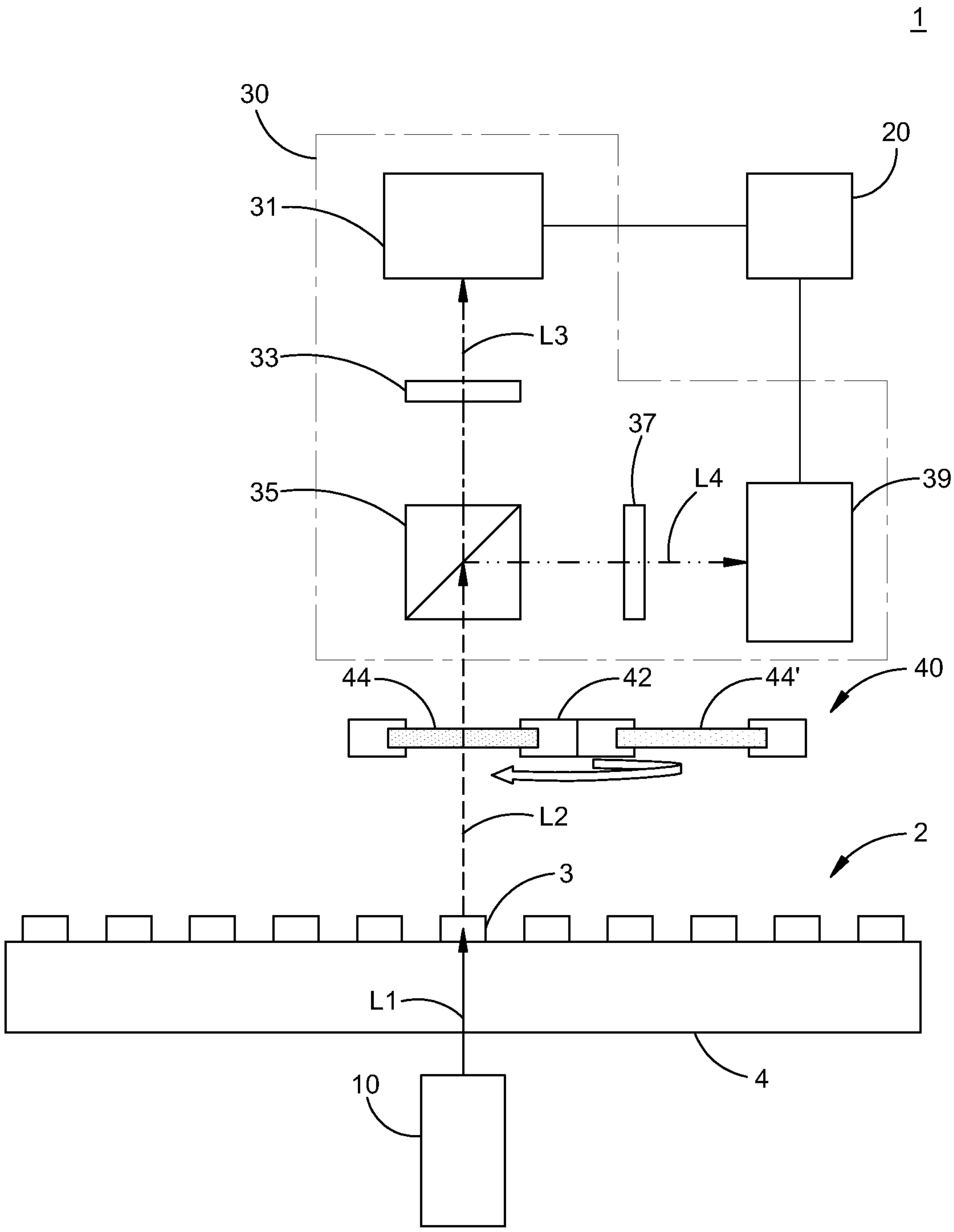
FIG. 3 shows a schematic diagram of the structure according to another embodiment of the present invention.

Please refer to FIG. 3, which shows a schematic diagram of the structure according to another embodiment of the present invention. As shown in the figure, the present embodiment is a second embodiment based on the first embodiment. According to the present embodiment, the light source 10 emits the mixed light beam L1 under the substrate 4 to induce photoluminescence of the object 2 from the backside and generating the inspection light beam L2. The connection and operation of the other components according to the present embodiment are identical to those according to the first embodiment described above. Hence, the details will not be repeated.

Figure 4A:
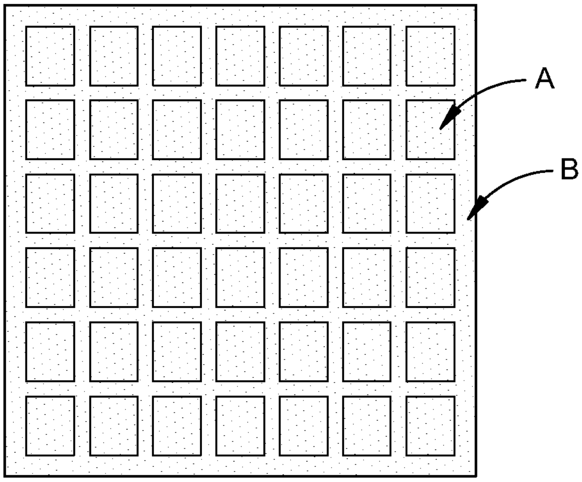
FIG. 4A to FIG. 4B show schematic diagram of image processing according to an embodiment of the present invention.
Figure 4B:
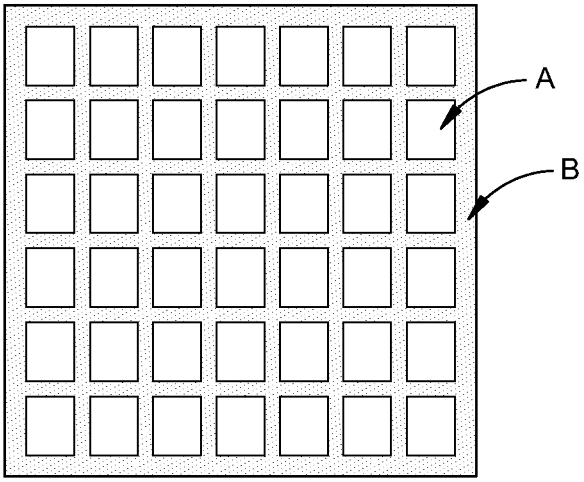

Please refer to FIG. 1 again and to FIG. 4A to FIG. 4B, which show schematic diagram of image processing according to an embodiment of the present invention. As shown in the figures, in the above first and second embodiments, after the first sensing element 31 receives the first split light beam L3, transmit the first image signal to the processing module 20; after the second sensing element 39 receives the second split light beam L4, transmit the second image signal to the processing module 20. The processing module 20 overlaps and strengthens the first image signal and the second image signal for generating an inspection result. Then the processing module 20 judges if defects or damages exist in the object 2 according to the inspection result.

The processing module 20 strengthens the acquired first image signal and the second image signal by amplification (for example, the phase-locked algorithm). According to the present embodiment, when the phase of the acquired image signal is identical to the reference phase, the image signal can be strengthened to increase the signal-to-noise ratios (S/N ratio) of the image. For example, the acquired image signal can be multiplied by the sine value of the reference phase at the time for acquiring the intensity of the in-phase image. The image signal is strengthened to give a clearer image signal.

The first image signal and the second image signal includes a plurality of bright regions A (for example, the plurality of LEDs 3) and a plurality of dark regions B (for example, the substrate 4). The processing module 20 removes the plurality of dark regions B in the image. Namely, the part emitting no light in the image is separated and removed, leaving only the part to be inspected.

According to an embodiment, the plurality of bright regions A and the plurality of dark regions B are differentiated according to brightness. Nonetheless, the present invention is not limited to the embodiment. They can be differentiated according to wavelength.

According to an embodiment, a plurality of images generated by the filtered light beam with multiple wavelengths can enhance the image.

Figure 5:
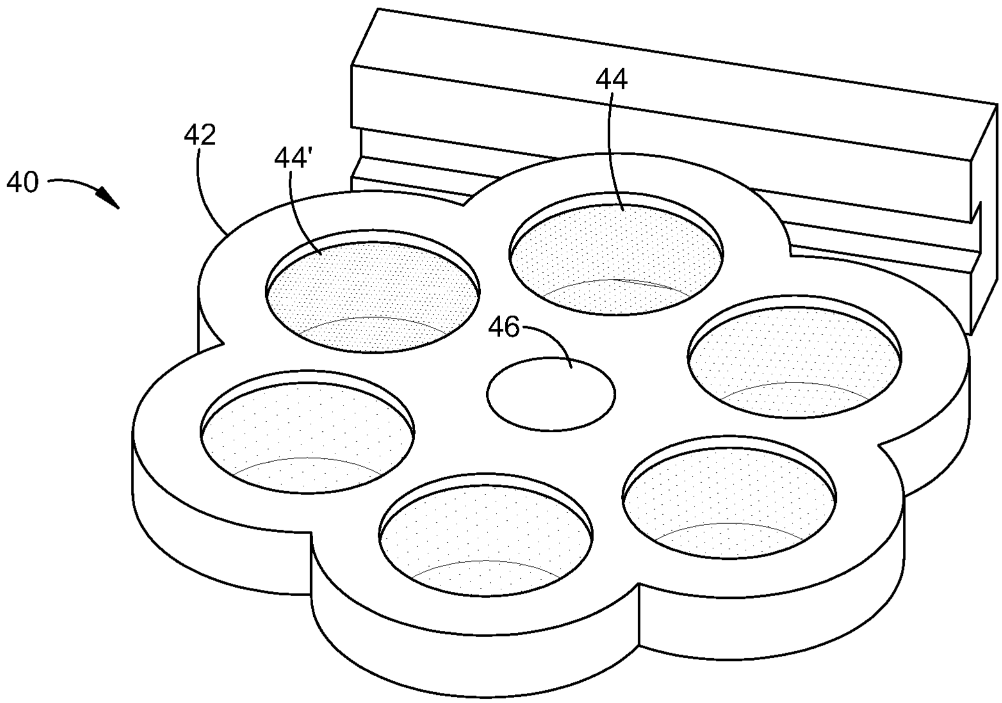
FIG. 5 shows a schematic diagram of the conversion structure according to an embodiment of the present invention.

According to the present embodiment, the inspection device 1 is connected electrically to the object 2. By illuminating the mixed light beam L1, the leakage current of the object 2 can be inspected. The leakage current of an LED is generally defined as the current measured when a reverse voltage is applied to the two terminals of the LED. At this moment, the LED can be approximately equivalent to a p-n junction diode, and its volt-ampere characteristics are similar to those of a general p-n junction. The leakage current measured at this time is the reverse current of the p-n junction. Excessive leakage current of LEDs will cause dim light, flickering, and dead lights. Please refer to FIG. 5, which shows a schematic diagram of the conversion structure according to an embodiment of the present invention.

As shown in the figure, the filter conversion module according to the present embodiment is the same as the one in the above first and second embodiments. According to the present embodiment, the filter conversion module 40 further includes a motor 46. The motor 46 rotates the conversion structure 42 to move one of the plurality of filters 44 corresponding to the beam splitter 45. Thereby, the plurality of filters 44 can be altered to give images with different wavelengths.

An objective of the present invention is to provide an inspection device, which uses photoluminescence to inspect micro LED panels. It comprise a conversion device of filters for acquiring images of multiple wavelengths of light. Then a secondary filter is used to remove short- and long-wavelength ranges to obtain a plurality of photoluminescence images. Furthermore, a processing module is adopted to assess defects or damages in micro LEDs. Thereby, the problems of low inspection efficiency and increased inspection time and costs in photoluminescence according to the prior art can be solved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An inspection device, using to inspect a micro-LED panel, comprising:

a light source, emitting a plurality of light beams to form a mixed light beam, including red, green, and blue light, wherein said mixed light beam is projected toward said micro-LED panel to induce photoluminescence of said micro-LED panel and generates an inspection light beam;

an inspection module, including:

a first sensing element;

a shortwave filter, a side of said shortwave filter disposed on a side of said first sensing element correspondingly;

a beam splitter, a side of said beam filter disposed on another side of said shortwave filter correspondingly;

a longwave filter, a side of said longwave filter disposed on another side of said beam splitter correspondingly; and a second sensing element, a side of second sensing element disposed on another side of said longwave filter correspondingly; and a filter conversion module, including a conversion structure and a plurality of filters, said plurality of filters embedded annularly around said conversion structure, and one of said plurality of filters disposed corresponding to said beam splitter;

wherein said plurality of filters are formed by a plurality of multi-broadband filters for wavelengths 600 nm-660 nm, 500 nm-550 nm, and 440 nm-470 nm; and said individual filtering wavelengths of said plurality of multi-broadband filters are different in the range;

wherein said first sensing element transmits said first image signal to a processing module; said second sensing element transmits said second image signal to said processing module; and said processing module overlaps and strengthens said first image signal and said second image signal for generating an inspection result.

2. The inspection device of claim 1, wherein said micro-LED panel includes a substrate and a plurality of micro-LEDs; and said plurality of micro-LEDs are disposed on said substrate.

3. The inspection device of claim 2, wherein said light source emits said mixed light beam above said substrate.

4. The inspection device of claim 2, wherein said light source emits said mixed light beam under said substrate.

5. The inspection device of claim 1, wherein said conversion structure rotates to move one of said plurality of filters corresponding to said beam splitter.

6. The inspection device of claim 1, wherein said conversion structure is rotated by a motor to move one of said plurality of filters corresponding to said beam splitter.

7. The inspection device of claim 1, wherein said individual filtering wavelengths of said plurality of filters are different.

* * * * *